United States Patent [19]
Abe et al.

[11] Patent Number: 5,674,914
[45] Date of Patent: Oct. 7, 1997

[54] METHOD AND APPARATUS FOR RECLAMATION OF WASTE POLYVINYL CHLORIDE

[75] Inventors: Masakazu Abe, 1479-8, Notsudacho, Machida, Tokyo, Japan, 194-01; Kiyoshi Murakami, Kagawa-ken, Japan

[73] Assignees: Mitsui & Co., Ltd.; Masakazu Abe, both of Tokyo, Japan

[21] Appl. No.: 522,105

[22] Filed: Aug. 31, 1995

Related U.S. Application Data

[63] Continuation of Ser. No. 244,078, filed as PCT/JP93/00037 Jan. 11, 1993 published as WO94/06854 Mar. 31, 1994, abandoned.

[30] Foreign Application Priority Data

Sep. 24, 1992 [JP] Japan ................... 4-295495

[51] Int. Cl.$^6$ ................... C08J 11/08; B08B 3/08
[52] U.S. Cl. ................... 521/46.5; 521/42.5; 524/592; 428/903.3; 422/901
[58] Field of Search ................... 521/46.5, 42.5; 422/901; 428/903.3; 524/592

[56] References Cited

U.S. PATENT DOCUMENTS

| | | | |
|---|---|---|---|
| 3,666,691 | 5/1972 | Spiller | 260/30.8 |
| 3,836,486 | 9/1974 | Hafner | 521/46.5 |
| 3,912,664 | 10/1975 | Wainer | 521/46.5 |
| 3,975,208 | 8/1976 | Tate et al. | 134/38 |
| 4,038,219 | 7/1977 | Boehm et al. | 521/46.5 |
| 4,071,479 | 1/1978 | Broyde et al. | 521/46.5 |
| 4,596,603 | 6/1986 | Pellegrin et al. | 134/12 |

FOREIGN PATENT DOCUMENTS 60-15433  1/1985  Japan.

Primary Examiner—Paul R. Michl
Assistant Examiner—Olga Asinovsky
Attorney, Agent, or Firm—Burns, Doane Swecker & Mathis LLP

[57] ABSTRACT

A method of reclaiming waste polyvinyl chloride according to the present invention includes the steps of bringing industrial waste containing polyvinyl chloride into contact with a solvent in which polyvinyl chloride can be dissolved, to remove polyvinyl chloride from the industrial waste, removing substances which cannot be dissolved in the solvent from a polyvinyl chloride solution consisting of the solvent and the polyvinyl dissolved therein, and recovering reclaimed polyvinyl chloride as a substance left over when the solvent is removed from the polyvinyl solution. The industrial waste to be reclaimed includes polyvinyl chips obtained from waste electric wires, polyvinyl chloride-impregnated wallpaper and used agricultural polyvinyl chloride sheets. The solvent used in the present invention consists of at least one kind of organic solvent selected from the group composed of methyl ethyl ketone, methyl isobutyl ketone and dioctyl phthalate.

10 Claims, 2 Drawing Sheets

METHOD AND APPARATUS FOR RECLAMATION OF WASTE POLYVINYL CHLORIDE

This application is a continuation, of application Ser. No. 08/244,078, filed as PCT/JP93/00037 Jan. 11, 1993 published as WO94/06854 Mar. 31, 1994 now abandoned.

TECHNICAL FIELD

The present invention relates to a technology for resource reutilization of plastics from industrial waste products that contain plastics. More particularly, the present invention relates to a method and apparatus for reclamation of waste polyvinyl chloride from industrial waste products that contain polyvinyl chloride, the efficient reclamation of which has been considered difficult, although such waste accounts for a large proportion of industrial waste products.

BACKGROUND ART

Based on the principal involved, conventional waste polyvinyl chloride reclamation technology can be divided into the flushing separation method (used in the flushing-type separator) in which separation is effected by differences in the specific gravity of the materials concerned, and the hot screening method of separation (used in the hot screening separator). In the case of used agricultural polyvinyl chloride sheet, flushing separation is the principal reclamation method used. This reclamation method uses the preprocessing steps of cutting, crushing and screening. Among the problems associated with the flushing separation method are that of low efficiency, low quality, and, in addition, because it requires large quantities of water, securing the necessary water and processing of the contaminated waste are also problems. As a result, used agricultural polyvinyl chloride sheet is usually disposed of by burning it in the open, discarding it in rivers, burying it and so forth, making it a major source of environmental pollution.

Processing using hot screening separators is used mainly for scrap electrical cable. The process consists of melting the polyvinyl chloride layer of the cable and passing it through a #60 to #100 mesh screen. As such, it is a high temperature, high pressure process, while the high viscosity of the material being processed is further problem. A further problem is that the polyvinyl chloride scrap material to which the process can be applied is limited to that in which there is a very low ratio of substances that do not melt at high temperatures such as scrap copper, scrap rubber, scrap polyethylene, waste paper and the like.

Thus, in practice electrical cable scrap and other such industrial waste products are disposed of by burial, and this has created an environmental pollution problem of major proportions.

On the other hand, while reclamation methods could be used based on the use of solvents to separate out plastic components, as yet no system apparatuses based on such methods have been developed for application to industrial waste products that contain polyvinyl chloride.

DISCLOSURE OF INVENTION

The object of the present invention is therefore to provide a method and apparatus for reclaiming the polyvinyl chloride components from industrial waste products that contain polyvinyl chloride without the need for large quantities of water or complex operations.

In accordance with the present invention, the above object is attained by a first method for reclaiming waste polyvinyl chloride from polyvinyl chloride scrap obtained from scrap electrical cable, wallpaper impregnated with polyvinyl chloride, used agricultural polyvinyl chloride sheet or a mixture thereof, the said method comprising the steps of dissolving out the polyvinyl chloride component from industrial waste products that contain polyvinyl chloride by bringing the industrial waste products into contact with a solvent able to dissolve the polyvinyl chloride, removing undissolved matter from the polyvinyl chloride solution thus formed by the dissolution of the polyvinyl chloride in the solvent, and recovering the reclaimed polyvinyl chloride in the form of the residue obtained by removing the solvent component from the polyvinyl chloride solution.

The object is also attained by a second method for reclaiming waste polyvinyl chloride from used agricultural polyvinyl chloride sheet or the like, the said method including the steps of removing foreign matter adhering to the surface of the waste polyvinyl chloride by dissolving slightly the outer surface layer of the waste polyvinyl chloride by bringing the waste polyvinyl chloride into contact at an ordinary temperature with a solvent able to dissolve the polyvinyl chloride component, and, after the foreign matter has been removed, recovering the reclaimed polyvinyl chloride by removing the solvent component from the waste polyvinyl chloride.

In accordance with the present invention, the reclamation apparatus for implementing the above reclamation methods is comprised of a first foreign matter removal means that removes foreign matter by the application of physical force to the waste polyvinyl chloride, a second foreign matter removal means that removes foreign matter by bringing the waste polyvinyl chloride into contact with the solvent, and solvent removal means that following the removal of the foreign matter evaporates the solvent adhering to the waste polyvinyl chloride.

Further, in accordance with the present invention, there is provided a method for reclaiming waste hard polyvinyl chloride, such as pipes, gutters, roofing and flooring materials made of hard polyvinyl chloride, which comprises the steps of crushing waste hard polyvinyl chloride on which foreign matter are adhered into prescribed-size pieces, removing foreign matter adhering to the surface of the waste polyvinyl chloride by slightly dissolving the outer surface layer of the waste polyvinyl chloride by bringing the crushed waste polyvinyl chloride into contact with a solvent able to dissolve the hard polyvinyl chloride component, and, after the foreign matter has been removed, recovering the reclaimed hard polyvinyl chloride by removing the solvent component from the waste hard polyvinyl chloride.

The solvents that may be used in the above waste polyvinyl chloride reclamation methods include benzene, toluene, methyl alcohol, ethyl alcohol, benzyl alcohol, diacetone alcohol, acetone, methyl ethyl ketone, methyl propyl ketone, methyl isobutyl ketone, orthopropyl acetate, isopropyl acetate, orthbutyl acetate, isobutyl acetate, amyl acetate, secondary hexyl acetate, amyl propionate, ethyl lactate, orthobutyl lactate, butyl glycolate, diethyl carbonate, ethylene glycol monoacetate, ethylene glycol monoethyl ether, glycol acetate, butylene glycol diacetate, dioxine, cyclohexanol acetate, methyl cyclohexanol, cyclohexanon, methyl cyclohexanon, dichloromethylene, carbon tetrachloride, dichloroethane, tetrachloroethane, dichloroethylene, trichloroethylene, monochlorobenzene, tetrahydrofurfuryl alcohol, triacetylene, dimethyl phthalate, diethyl phthalate, and dioctyl phthalate. Of these, a solvent constituted of methyl ethyl ketone (hereinafter also referred to as "MEK"), methyl isobutyl ketone (hereinafter also referred to as "MIBK"), or dioctyl phthalate (hereinafter also referred to as "DOP"), either singly or in combination, is suitable with respect to ease of the deodorization and separation operations, safety considerations relating to ignitability and toxicity, and economic considerations relating to the cost of the chemicals involved and of the energy required to recover the solvent. Methyl ethyl ketone is particularly suitable for use with the latter of the two methods of reclamation described above.

In this invention, it is preferable for the solvent used in the processing of the waste polyvinyl chloride to be reused following the recovery thereof.

BEST MODE FOR CARRYING OUT THE INVENTION

First Embodiment

Figure 1:
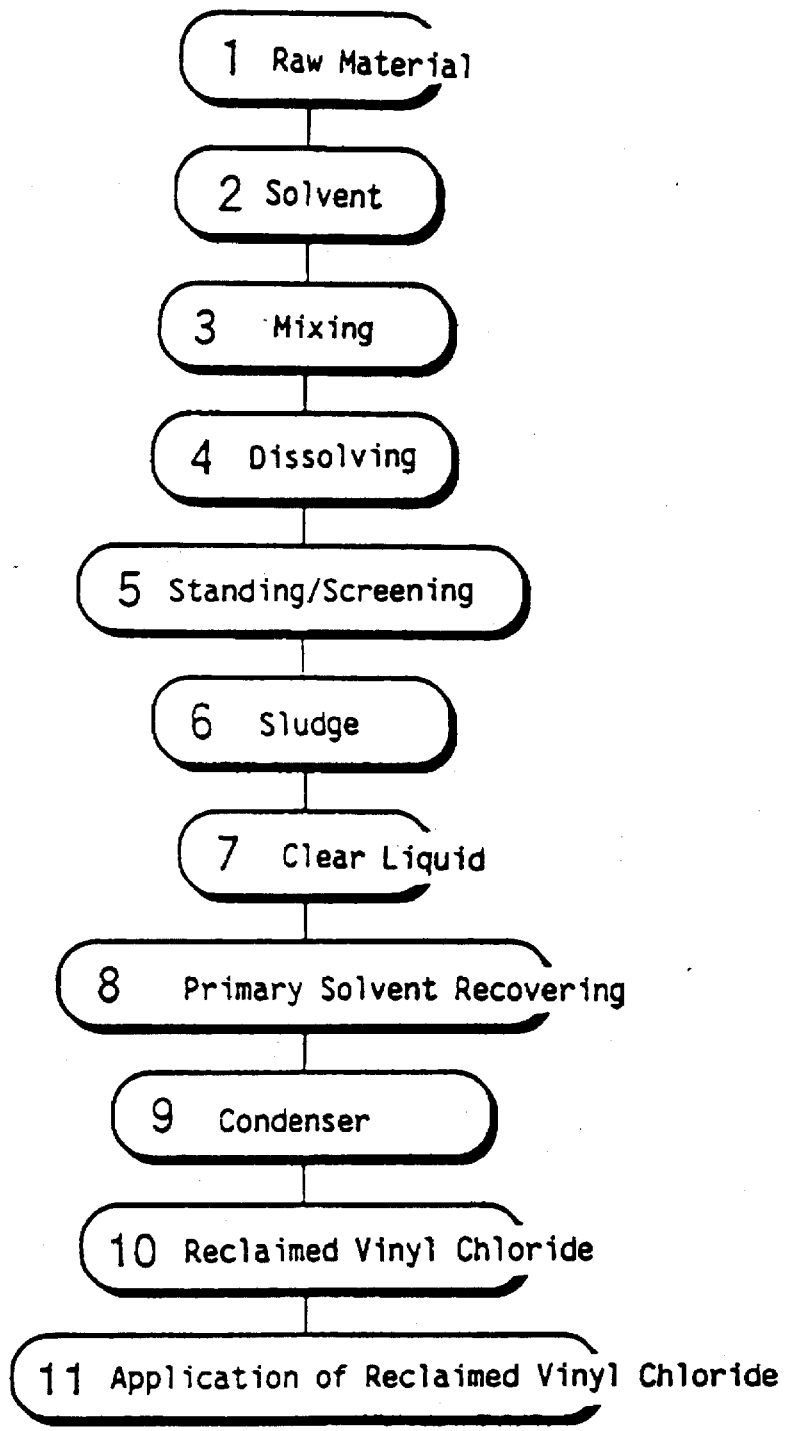
FIG. 1 a flow chart of part of the waste polyvinyl chloride reclamation method according to a first embodiment of the present invention.

A first embodiment of the present invention will now be described with reference to a method of reclaiming polyvinyl chloride from industrial waste products that contain polyvinyl chloride. Before describing the various polyvinyl chloride reclamation methods, the basic steps of the process will be described with reference to FIG. 1.

The raw material i that is to be subjected to the reclamation process is polyvinyl chloride used to cover electrical cable, which is obtained by crushing the cable and using the different specific gravities of the polyvinyl chloride and copper to separate out the polyvinyl chloride, wallpaper impregnated with polyvinyl chloride, used agricultural polyvinyl chloride sheet and other such industrial waste products that usually use soft polyvinyl chloride.

For the solvent 2 used to dissolve the polyvinyl chloride component contained in the industrial waste products, it is preferable to use a substance that offers good solubility, safety and recoverability, has a boiling point of around 80° C., and is either non-toxic and non-ignitable or has low toxicity and a high ignition point. Specific examples of such a substance include MEK, MIBK and DOP, which can be used on their own or in combination. A secondary plasticizer can be added to the solvent to reduce the polyvinyl chloride solution viscosity and make it easier to separate out solids.

The raw material 1 and solvent 2 are mixed in the mixing step 3. This can be done by stirring the prescribed ratio of industrial waste products and solvent in a mixing tank, for example, until the mixture is sufficiently homogeneous. For the dissolving step 4, the mixture is then pumped into a dissolving tank by a slurry pump. By weight, the ratio of raw material 1 to solvent 2 is set at one part of raw material 1 to about nine parts of solvent 2. Depending on the type of raw material 1, the ratio may be set at about fifteen parts of solvent 2 to one part of raw material 1.

In step 4 the stirring of the raw material 1 and the solvent 2 is continued to dissolve the raw material 1 in the solvent 2. The temperature of the mixture in step 4 is set to around 78° C. when the solvent 2 is MEK (which has a boiling point of 81° C.). A condenser arrangement is used to recover the solvent evaporated in step 4 for reuse as the solvent 2. The prescribed length of time for step 4 is about ten minutes to one hour, preferably ten minutes to thirty minutes, measured from the point at which the mixture reaches the specified temperature.

After the completion of step 4, the heating and stirring are stopped for the standing and screening of step 5, whereby there is a natural separation of the polyvinyl chloride in solution and undissolved components. The longer the time the mixture is allowed to stand, the better the separation. However, if necessary the separation can be effected in a short time by using a pressure filter that can be maintained at a temperature at which the viscosity of the polyvinyl chloride solution does not increase.

After the mixture has been allowed to stand in step 5, it separates into a clear liquid 7 (the polyvinyl chloride solution) at the upper portion. When this is transferred, it leaves a sludge 6 of undissolved components. Fresh solvent is added to this sludge 6 in a ratio, by weight, of about three or four parts of solvent to one part of sludge, and the mixture is then stirred. The solvent and sludge 6 are then separated using a metal drum filter with a mesh of #120 or so. This removes polyvinyl chloride solution adhering to the sludge 6. For this purpose, the solvent 2 used to dissolve the raw material 1 is reutilized.

The upper clear liquid 7 is pumped onward for the primary solvent recovery step 8. Raw material, plasticizer or secondary plasticizer may be mixed in with the clear liquid 7 to facilitate the solvent evaporation operation of step 8. A high proportion of the polyvinyl chloride solution (i.e. the clear liquid 7) is solvent, so in step 8 the solvent is forcibly evaporated to recover the reclaimed polyvinyl chloride 10 in which only a slight amount of solvent remains. The solvent removal process of step 8 continues until just before the point where it becomes impossible to pump the reclaimed polyvinyl chloride 10. The solvent evaporated in step 8 is precipitated by the condenser 9 and recovered for reuse as the solvent 2.

Thus, immediately after the solvent has been removed from the reclaimed polyvinyl chloride 10 in step 8, the reclaimed polyvinyl chloride 10 includes a small amount of the solvent. A rotary impeller is therefore used to cut and decompress the reclaimed polyvinyl chloride to remove all solvent from the reclaimed polyvinyl chloride 10.

The application for which the polyvinyl chloride thus reclaimed will be used is decided in accordance with the hue and other such qualities that are based on the properties of the raw material 1. For example, if the raw material 1 is scrap electrical cable, the color will be relatively dark, while if the raw material 1 is used agricultural polyvinyl chloride sheet, the color will be relatively light.

A method of reclaiming waste polyvinyl chloride obtained from electrical cable scrap will now be described with reference to the basic process flow described above.

The waste polyvinyl chloride used in this case is what is left after the copper has been recovered from the scrapped electrical cable, and includes pulp, rubber, copper particles and so forth. The polyvinyl chloride component actually amounts to 70 to 90 percent of the total electrical cable scrap.

First, the dissolving tank is charged with the required amount of MEK to attain the prescribed weight ratio of nine parts of solvent to one part of polyvinyl chloride waste, and then the polyvinyl chloride waste is added.

The MEK is then stirred while it is gradually heated to around 75° C., during which time the polyvinyl chloride dissolves in the MEK.

The heating and stirring are then stopped and the mixture is left to stand for about one hour to allow the separation of the polyvinyl chloride solution and the non-soluble portion of the mixture.

The polyvinyl chloride solution thus separated is stirred and heated to effect the evaporation of the MEK, which is recovered through precipitation. The evaporation of the MEK is carried out at a reduced pressure of about −740 mm of mercury to prevent heat degradation of the polyvinyl chloride while at the same time ensuring that the evaporation of the MEK proceeds efficiently even at the low temperature setting. With the progress of the MEK evaporation process, the viscosity of the polyvinyl chloride solution rise until stirring becomes difficult, which is the point at which almost all of the solvent has been removed from the polyvinyl chloride solution, leaving the reclaimed polyvinyl chloride, which is then transferred to a drier equipped with a high-speed impeller and a jacket, where the remaining solvent is removed from the reclaimed polyvinyl chloride. The solvent evaporated from the reclaimed polyvinyl chloride is recovered for reuse.

This method enables about 870 grams of polyvinyl chloride flakes to be reclaimed from about 1,000 grams of polyvinyl chloride waste, and also produces some 132 grams of sludge and about 2 grams of unrecovered solvent. Thus, the reclaimed polyvinyl chloride recovery ratio is about 87 percent relative to the raw material.

The reclaimed polyvinyl chloride is gray and can be used for polyvinyl chloride flooring tiles, shoe soles, or as a compound material. The sludge can be used to make artificial trees and the like.

The reclamation method of this embodiment also offers good economic efficiency, as the used solvent can be recycled and used again. The MEK used as the solvent facilitates deodorization and separation, it is safe, and it is highly economic in terms of the cost of the solvent and the energy required to recover it.

Second Embodiment

A second embodiment of the present invention will now be described with reference to a method of recovering waste polyvinyl chloride from used agricultural polyvinyl chloride sheet. The method follows the same procedure shown in the flow chart of FIG. 1.

One kilogram of waste polyvinyl chloride sheet from which most of the foreign matter has been washed is mixed with about 9 Kilograms of MIBK which is used as the solvent, and the mixture is stirred while being heated to about 110° C. to thereby dissolve the polyvinyl chloride in the MIBK. The stirring and heating are then stopped and the mixture is left to stand for about 1 hour, during which the mixture separates into an upper layer of polyvinyl chloride solution over a layer of sand and the like that settles onto the floor of the tank. The polyvinyl chloride solution is then subjected to evaporation at reduced pressure to separate out the solvent, which is recovered for reuse.

This enables some 900 grams of vinyl chloride flakes to be reclaimed from the 1 kilogram or so of waste polyvinyl chloride sheet for a recovery rate of around 90 percent. The polyvinyl chloride thus reclaimed is light brown in color and is of much better quality than vinyl chloride reclaimed by the conventional methods, giving it a wide range of application including as a composite with sheet products used to form smoked products and in automotive applications. Vinyl chloride reclaimed from used agricultural polyvinyl chloride sheet by conventional methods still has the characteristic agricultural odor and is not fully rid of dirt and sand, which severely restricts the range of applications for which the reclaimed polyvinyl chloride can be used. However, the polyvinyl chloride reclaimed by the method of the present invention is odorless and free of foreign matter, so there are virtually no limitations on how it can be utilized.

Among the advantages of using MIBK as the solvent are that it facilitates deodorization and separation, and it is safe and highly economic.

Third Embodiment

A third embodiment of the present invention will now be described with reference to a method of recovering waste polyvinyl chloride from wallpaper that has been impregnated with polyvinyl chloride. The method follows the same procedure shown in the flow chart of FIG. 1.

One kilogram of the wallpaper forming the raw material 1s mixed with about 9 kilograms of MEK which is used as the solvent.

The mixture is then stirred while being heated to about 70° C. to thereby cause the polyvinyl chloride in the wallpaper to dissolve in the MEK.

A filter is used to separate the polyvinyl chloride solution from the paper fiber. The polyvinyl chloride solution thus separated is then subjected to evaporation at reduced pressure to remove out the solvent, leaving the reclaimed polyvinyl chloride which is recovered. The MEK evaporated under reduced pressure is recovered for reuse.

Three parts by weight of MEK is used to wash the fiber portion, which is then placed in a drier whereby the solvent is recovered as it is removed from the fiber. As a result, some 80 grams of fiber is obtained that does not contain any polyvinyl chloride, a recovery rate of about 8 percent.

Thus, the reclaimed polyvinyl chloride amounts to some 920 grams. With the conventional methods such recovery has been considered impossible owing to the fact that the impregnation by the polyvinyl chloride extends to the interior of the wallpaper. However, in accordance with the present invention, the polyvinyl chloride can be readily recovered. The polyvinyl chloride thus recovered is a pale yellowish brown in color, but the degree of coloration is so low that it can be used by polyvinyl chloride product manufacturers as an admixture, reutilized for wallpaper, to adjust colors, and in other such applications. The fiber obtained from the wallpaper can also be recycled.

Fourth Embodiment

With respect to a fourth embodiment, a first method for reclaiming waste polyvinyl chloride in accordance with the present invention, and an apparatus for implementing the waste polyvinyl chloride reclamation method, will now be described with reference to FIG. 2.

Figure 2:
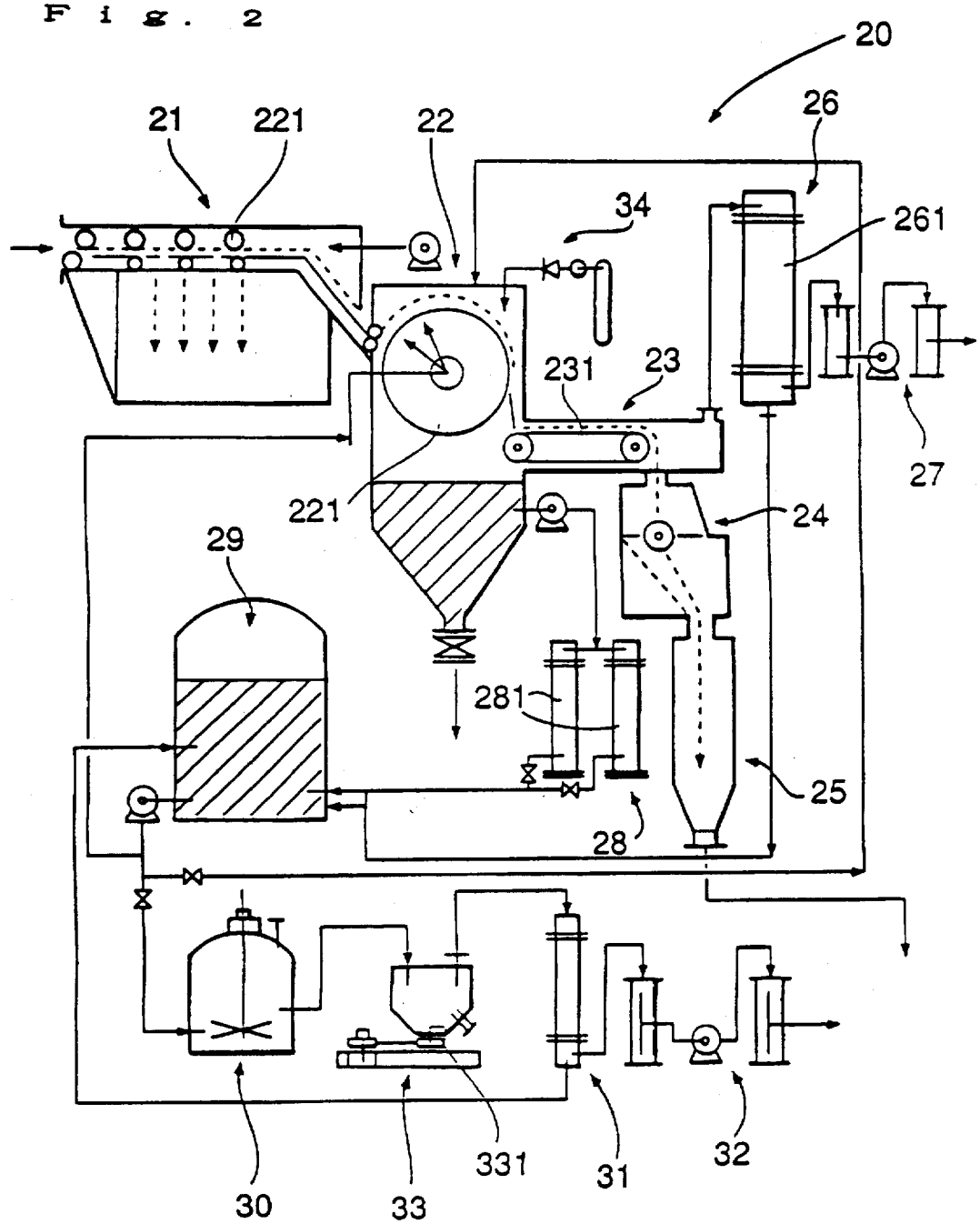
FIG. 2 shows the configuration of a waste polyvinyl chloride reclamation apparatus according to a fourth embodiment of the present invention.

FIG. 2 shows the general arrangement of the waste polyvinyl chloride reclamation apparatus according to this embodiment. With reference to the figure, a waste polyvinyl chloride reclamation apparatus 20 is comprised of a separator 21 (first foreign matter removal means) in which multiple rotary brushes 211 are used to continuously remove sand and dirt from used agricultural polyvinyl chloride sheet inserted lengthwise into the raw material inlet, and a washer 22 (second foreign matter removal means) that sprays solvent onto both surfaces of the agricultural polyvinyl chloride sheet which has thus been cleaned of most of the foreign matter and then guided around the circumference of a rotating drum 221. The effect of this solvent sprayed on the polyvinyl chloride sheet by the washer 22 is to clean off fine particles of foreign matter not removed by the separator 21, which is done by dissolving just the outermost surface layer of the sheet.

The temperature of the solvent delivered by the washer 22 is around 30 ±10° C. (normal room temperature). Although this is a relatively low temperature, because of the rapidity with which the MEK solvent used dissolves the surface of agricultural polyvinyl chloride sheet even at normal room temperature, spraying even for only the prescribed 3 to 5 seconds is enough to provide the required effect. The solvent used in the spraying process is recycled after entrained dirt is filtered out by a filter unit 28 equipped with a filter 281. The polyvinyl chloride sheet thus sprayed with the solvent becomes softened and is already transparent. The washer 22 is associated on the downstream side with a separator-drier 23 (solvent removal means). The polyvinyl chloride sheet from which all foreign matter has been removed by the solvent is moved through the separator-drier 23 by a #60 to #100 mesh screen belt conveyor 231. The polyvinyl chloride sheet being thus conveyed is subjected to indirect heating from above and below to remove adhering solvent under reduced pressure. The solvent thus removed is channeled to a solvent recovery unit 26 equipped with a condenser 261 where it is condensed and recycled. Provided on the downstream side of the separator-drier 23 is a pulverizer 24 which pulverizes the solvent-free polyvinyl chloride sheet into coarse flakes with an average diameter of 10 to 15 mm. These flakes are then transferred to a product weighing machine 25 by a blower unit (not shown). The weighing machine 25 weighs the polyvinyl chloride flakes and prepare them for shipment.

The solvent recovery unit 26 is connected to a reduced-pressure recovery unit 27 to enable the solvent to be evaporated by the separator-drier 23 at a lower temperature. Also, with the aim of preventing the solvent becoming contaminated by dirt from the continuous washing operation of the washer 22, the washer 22 is provided with the filter 281 which removes the dirt by filtering the solvent under pressure, while the solvent output by the filter unit 28 is directed into a solvent holding tank 29. In order to maintain the continuous solvent washing operation of the washer 22, a constant minimum flow of solvent is maintained from the solvent holding tank 29 to the washer 22 and, also, when the polyvinyl chloride in the solvent returning via the filter unit 28 reaches a certain concentration, it is delivered to the concentration tank 30 for recycling. That is, in the concentration tank 30 just the portion of the solvent in which the concentration of dissolved polyvinyl chloride has reached a certain level is evaporated, thereby concentrating the polyvinyl chloride component. A solvent recovery unit 31 is used to recover the evaporated solvent for recycling purposes. As the concentration of the polyvinyl chloride solution in the concentration tank 30 is increased by the evaporation of the solvent, the viscosity of the polyvinyl chloride solution increases to the point where it becomes difficult to stir. At that point, the polyvinyl chloride solution, now becoming a gradually solidifying slurry, is cut into small pieces by the high-speed impeller 331 of a solvent separator unit 33, while at the same time the pressure inside the solvent separator unit 33 is reduced. This enables solvent contained in the polyvinyl chloride slurry to be forcibly removed in the solvent separator unit 33 and the slurry to be formed into flakes. To accomplish this, the solvent separator unit 33 is connected to a reduced-pressure recovery unit 32 via the solvent recovery unit 31. This enables the evaporation of the solvent in the concentration tank 30 and solvent recovery unit 31 to proceed at a relatively low temperature.

To permit the solvent to be sprayed at normal room temperature in the washer 22 without the risk of the solvent being ignited by a stray spark or the like, the washer 22 is connected to an $N_2$ gas into the interior of the washer 22.

The method of reclaiming used agricultural polyvinyl chloride sheet using the reclamation apparatus thus configured will now be described.

Although used agricultural polyvinyl chloride sheet to be used for recovery purpose is supposed to be provided with sand, dirt and other such adhering foreign matter removed, in fact such sheet is usually provided with foreign matter still adhering. Moreover, because the quantities of foreign matter adhering to the sheet varies, the quality of the polyvinyl chloride reclaimed from such sheet is not constant. Therefore, for the reclamation method according to the present invention a 100-kilogram sheet of used agricultural polyvinyl chloride is cut into strips about 1.2 meters wide from which the rotating brushes of the separator 21 are used to remove most of the foreign matter.

The polyvinyl chloride sheet is then guided around the rotating drum 221 and is then sprayed for 3 to 5 seconds with a solvent at a temperature of 30 ±10° C. There is a one-to-one ratio between the weight of the solvent thus sprayed and the weight of the polyvinyl chloride sheet. The effect of the solvent thus sprayed on the polyvinyl chloride sheet by the washer 22 is to remove fine particles of foreign matter that were not removed by the separator 21 by dissolving the outermost surface layer of the sheet. The temperature of the solvent delivered by the washer 22 is around 30 ±10° C. (normal room temperature). Although this is a relatively low temperature, because of the rapidity with which the MEK solvent dissolves the surface of agricultural polyvinyl chloride sheet even at normal room temperature, spraying even for only the prescribed 3 to 5 seconds is enough to provide the required effect.

Also, because the polyvinyl chloride sheet is not subjected to unnecessary dissolution, the process products minimal decrease in the weight of the sheet. The polyvinyl chloride sheet is then conveyed by the screen belt conveyor 231 while being heated from above and below to remove adhering solvent. This drying takes about 5 minutes.

The above process recovers 75 kilograms of odorless polyvinyl chloride. Thus, while polyvinyl chloride reclaimed from used agricultural polyvinyl chloride sheet by conventional methods retains the characteristic agricultural odor and is not fully rid of dirt and sand, severely restricting the range of applications for which the reclaimed vinyl chloride can be used, the polyvinyl chloride reclaimed by the method of the present invention is odorless and free of foreign matter, so there are virtually no limitations on how it can be utilized.

In accordance with the method and apparatus of this invention, solvent that has been sprayed by the washer 22 and thereby become contaminated in the process is recycled by filtering it through the filter unit 28, and contaminated solvent is also recovered in the concentration process, so that nearly all the solvent used can be recycled. Specifically, of the 100 kilograms of solvent used, 85 percent is recovered in contaminated form following the spraying process and about 9 kilograms of the evaporated solvent is recovered, so only about 6 kilograms of solvent is consumed. Moreover, petroleum engineering data relating to wax refining indicate that the recovery rate can be further improved by raising the cooling capacity of the condenser. The MEK used as the solvent facilitates deodorization and separation, and it is safe and highly economic in terms of the cost of the solvent and the energy required to recover it.

Fifth Embodiment

A fifth embodiment of the present invention will now be described which is applied for reclaiming polyvinyl chloride from waste hard polyvinyl pipes. The waste of hard polyvinyl chloride pipes is not able to clear foreign matter adhered on the surface thereof by water washing. In the present embodiment, firstly, these waste pipes were crushed into pieces in size of 10 mm to 15 mm. The thus crushed hard polyvinyl chloride pieces were subjected to showering of MEK solvent. A washer unit used is provided therein with a drum filter of metal mesh, the lower portion of which is dipped in MEK solvent stored in the bottom of the washer unit. The hard polyvinyl chloride pieces were introduced through an inlet of the washer unit. In the washer unit, the hard polyvinyl chloride pieces are transferred to an outlet of the washer unit by the rotating drum filter. During transfer of the hard polyvinyl pieces, MEK solvent was showered on the hard polyvinyl pieces from the above, whereby the outermost surfaces of the pieces were slightly dissolved and foreign matter adhered on the surfaces of the pieces were separated and washed from the surfaces thereof. The time for separating and washing operation was about 2 to 3 minutes. The MEK solvent was maintained in temperature of 40° C. ±5°.

After separation of foreign matter from the surfaces, the hard polyvinyl chloride pieces were carried out from the washer unit by the drum filter, and after that, were softened by MEK solvent heated in temperature to 60° C. to 70° C. Finally, the MEK solvent was completely separated from the softened hard polyvinyl chloride pieces to thereby obtain reclaimed hard polyvinyl chloride.

The reclamation rate of the hard polyvinyl chloride was 97%, that is, 97 kilograms of reclaimed hard polyvinyl chloride was obtained. In addition, according to the present embodiment, the solvent used in each processes was filtered and feedbacked to the crushed hard polyvinyl chloride pieces. Thereby, plastisizer dissolved out from the pieces is equally distributed into the reclaimed product, whereby the degradation in quality of the reclaimed product can be prevented.

Sixth Embodiment

Next, a sixth embodiment of the present invention will be described which is applied for reclaiming polyvinyl chloride from used spice bottles of hard polyvinyl chloride.

In general, collected waste bottles of hard polyvinyl chloride cannot be distinguished apparently from waste bottles of polyesters. Usually collected waste polyvinyl chloride products include waste polyester products in an amount of 30 to 40%. In addition, a majority of polyvinyl chloride bottles have an inlet portion made of polyethylene. Thus, it requires to separate these three materials for reclaiming polyvinyl chloride.

According to the present embodiment, firstly, 100 kilograms of mixed raw materials as mentioned above were crushed into pieces in size of 10 mm to 5 mm. The crushed pieces were introduced into a mixed solvent of MED and MIBK which is maintained in temperature of about 75° C. ±3° C. and were stirred, whereby hard polyvinyl chloride were only dissolved. Next, Utilizing a drum filter or the like, polyesters and polyethylenes remaining in the hard polyvinyl chloride solution as undissolved materials were separated from the hard polyvinyl chloride solution by using a drum filter or the like. The separated hard polyvinyl chloride solution is condensed by a condenser. The condensed material was then removed the solvent completely to obtain reclaimed hard polyvinyl chloride flakes.

On the other hand, the separated mixture of polyethylenes and polyesters was introduced into perchloroethylene solvent heated in temperature to about 110° C. ±5° C. and stirred for three to 5 minutes. Thereafter, using a drum filter, the solution was separated undissolved material therefrom. The undissolved material is polyesters while dissolved material into the solution is polyethylenes. From these materials, reclaimed polyesters and polyethylenes were obtained.

Seventh Embodiment

Next, a yet another embodiment of the present invention will be described. The present embodiment is a method for reclaiming polyvinyl chloride from collected waste of packages of eggs, vegetable, fruit and the like. Such collected waste includes usually polyvinyl chloride and polysthylene products. Thus, these two materials must be separated. In addition, waste wash bottles are made of material classified as hard polyvinyl chloride, these waste wash bottles are also mixed in the collected waste.

According to the present embodiment, 100 kilograms of such waste mixture is introduced and stayed for about 60 seconds in perchloroethylene solvent at a room temperature (25° C. ±10° C.) to thereby dissolve polystylenes in the perchloroethylene solvent. Next, utilizing drum filter or the like, undissolved polyvinyl chlorides were separated from the solution. Polysthylenes were separated from the perchloroethylene solvent by a rotating vapor-separator to obtain reclaimed polysthylenes.

On the other hand, the separated polyvinyl chlorides were separated the perchloroethylene solvent form the surface thereon, and then introduced in MEK solvent. By stirring the solvent, the polyvinyl chlorides were dissolved in the MEK solvent. After that, utilizing a vapor-separator, polyvinyl chloride flakes were separated from the solution. The thus separated polyvinyl chloride was found that it has a quality for use as reclaimed product.

Industrial Applicability

As mentioned above, the method of reclaiming polyvinyl chloride components according to the present invention is characterized in that a solvent to dissolve the polyvinyl chloride component is used to separate foreign matter from the polyvinyl chloride components in industrial waste products, and the separated polyvinyl chloride components are recovered as the reclaimed polyvinyl chloride. Therefore, according to the present invention, industrial waste products involving polyvinyl chloride content which is a major source of environmental pollution can be processed to recover by using a solvent and with a simple apparatus and a simple operation. Further, irrespective of the quality or quantity of the foreign matter involved in the industrial waste products, polyvinyl chloride components can be reclaimed by the present method. Where the foreign matter is paper, metal, PP, PET, PE or the like, it can be recovered in a state able to reuse. Accordingly, the amount of industrial waste products which are to be discarded or buried in the open can be reduced, which enables to solve environmental pollution.

Furthermore, the use of MEK, MIBK and the like as an solvent has advantages in that it is easy to deodorize, it is easy to carry out separating operations, it is safe in terms of ignitability and of toxicity, and it is economic in terms of the cost of the chemicals involved and of the the energy required to recover the solvent, and the like.

We claim:

1. A method for reclaiming waste polyvinyl chloride comprising foreign matter adhering to a surface thereof, said method comprising the steps of:

contacting the waste polyvinyl chloride with a solvent capable of dissolving polyvinyl chloride at room temperature to dissolve slightly the outer surface layer of the waste polyvinyl chloride and to remove foreign matter adhering to the surface of the waste polyvinyl chloride;

evaporating the solvent to obtain a gradually solidifying polyvinyl chloride slurry;

cutting the polyvinyl chloride slurry into small pieces under a reduced pressure to remove substantially all of the remaining solvent from the polyvinyl chloride slurry.

2. The method according to claim 1, further comprising recovering and recycling the solvent after the solvent has been contacted with the waste polyvinyl chloride.

3. The method according to claim 1, wherein the solvent comprises at least one selected from the group consisting of methyl ethyl ketone, methyl isobutyl ketone, and dioctyl phthalate.

4. The method according to claim 1, wherein the waste polyvinyl chloride is used agricultural polyvinyl chloride sheets.

5. The method according to claim 1, wherein the polyvinyl chloride slurry is cut into small pieces using a rotary impeller.

6. A method for reclaiming waste hard polyvinyl chloride, said method comprising the steps of:

crushing the waste hard polyvinyl chloride into pieces of a prescribed size;

contacting the crushed, waste hard polyvinyl chloride with a solvent capable of dissolving polyvinyl chloride at room temperature to dissolve slightly the outer surface layer of the crushed, waste hard polyvinyl chloride and to remove any foreign matter adhering to a surface thereof;

evaporating the solvent to obtain a gradually solidifying polyvinyl chloride slurry;

cutting the polyvinyl chloride slurry into small pieces under a reduced pressure to remove substantially all of the remaining solvent from the polyvinyl chloride slurry.

7. The method according to claim 6, further comprising recovering and recycling the solvent after the solvent has been contacted with the crushed, waste hard polyvinyl chloride.

8. The method according to claim 6, wherein the solvent comprises at least one selected from the group consisting of methyl ethyl ketone, methyl isobutyl ketone, and dioctyl phthalate.

9. The method according to claim 6, wherein the waste hard polyvinyl chloride is at least one selected from the group consisting of waste pipes, gutters, and roofing and flooring materials made of hard polyvinyl chloride.

10. The method according to claim 6, wherein the polyvinyl chloride slurry is cut into small pieces using a rotary impeller.

* * * * *